US010618797B2

(12) United States Patent
Scott

(10) Patent No.: US 10,618,797 B2
(45) Date of Patent: Apr. 14, 2020

(54) VOLATILE LIQUIDS REFUELING APPARATUS WITH DUAL LOCKING RECEIVER

(71) Applicant: Steven Richard Scott, Curlew, WA (US)

(72) Inventor: Steven Richard Scott, Curlew, WA (US)

(73) Assignee: Motion Pro, Inc., Loomis, CA (US)

( * ) Notice: Subject to any disclaimer, the term of this patent is extended or adjusted under 35 U.S.C. 154(b) by 103 days.

(21) Appl. No.: 15/710,113

(22) Filed: Sep. 20, 2017

(65) Prior Publication Data
US 2018/0251365 A1 Sep. 6, 2018

Related U.S. Application Data

(63) Continuation-in-part of application No. 15/449,986, filed on Mar. 5, 2017, now Pat. No. 10,259,700.

(51) Int. Cl.
| | |
|---|---|
| *B67D 7/04* | (2010.01) |
| *B67D 7/54* | (2010.01) |
| *F16K 17/04* | (2006.01) |
| *B67D 7/00* | (2010.01) |
| *F16K 27/02* | (2006.01) |
| *F16K 15/02* | (2006.01) |

(52) U.S. Cl.
CPC ............ *B67D 7/0478* (2013.01); *B67D 7/005* (2013.01); *B67D 7/54* (2013.01); *F16K 15/026* (2013.01); *F16K 17/0413* (2013.01); *F16K 27/0209* (2013.01)

(58) Field of Classification Search
CPC ...... B67D 7/0478; B67D 7/04; B67D 7/0476; B67D 7/06; B67D 7/005; B67D 7/54; F16K 15/026; F16K 17/0413; F16K 27/0209
See application file for complete search history.

(56) References Cited

U.S. PATENT DOCUMENTS

| | | | | |
|---|---|---|---|---|
| 6,506,513 | B1 * | 1/2003 | Yonetsu | H01M 8/04186 429/448 |
| 8,776,843 | B2 * | 7/2014 | Komiya | B65B 3/04 141/93 |
| 9,534,621 | B2 * | 1/2017 | Brown | F16L 19/025 |
| 10,259,700 | B2 * | 4/2019 | Scott | B67D 7/0478 |
| 2004/0209142 | A1 * | 10/2004 | Becerra | H01M 8/04082 141/349 |
| 2005/0084722 | A1 * | 4/2005 | Bullock | H01M 8/04208 429/462 |
| 2006/0006108 | A1 * | 1/2006 | Arias | H01M 8/04208 210/232 |
| 2006/0078770 | A1 * | 4/2006 | Takahashi | H01M 8/04186 429/449 |
| 2013/0327439 | A1 * | 12/2013 | Pitney | F17C 5/06 141/346 |

* cited by examiner

*Primary Examiner* — Nicolas A Arnett
(74) *Attorney, Agent, or Firm* — Larry B. Guernsey; Patent Law Office of Larry Guernsey

(57) ABSTRACT

A volatile liquid refueling apparatus, which includes a probe including an outer collar, and a receiver including a receiving collar, where the outer collar of the probe and the receiving collar of the receiver are configured to join to create a vapor-tight enclosure, and where the receiver further includes a dual locking mechanism whereby the apparatus can be locked in either an open position or a closed position.

1 Claim, 10 Drawing Sheets

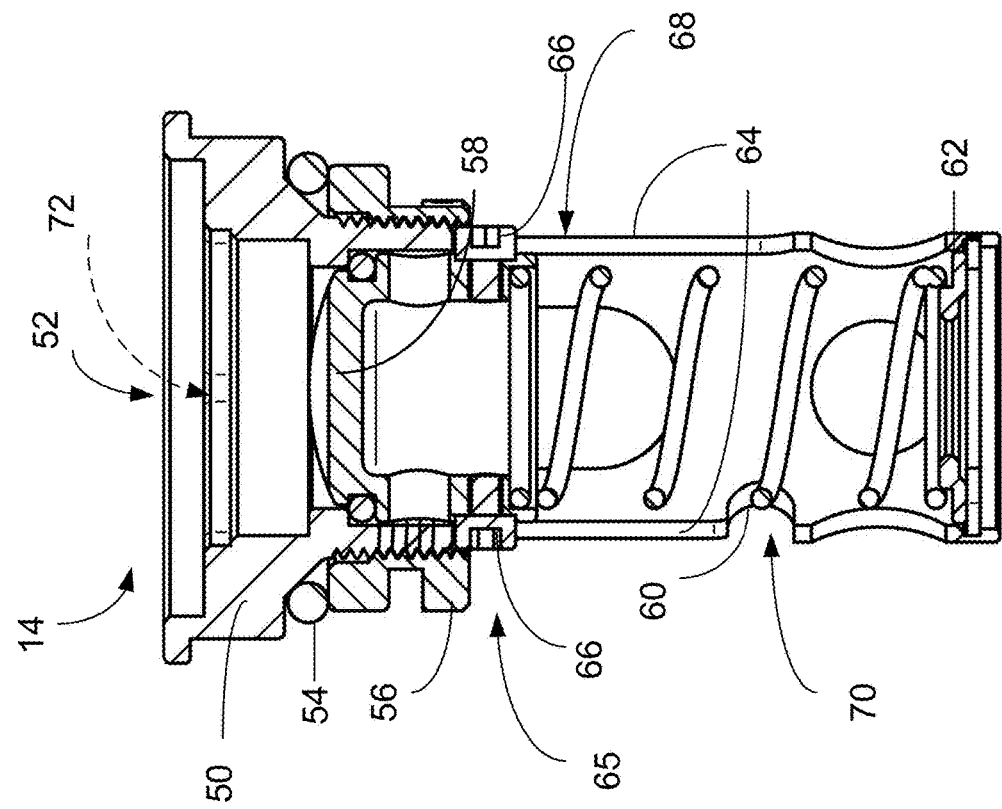
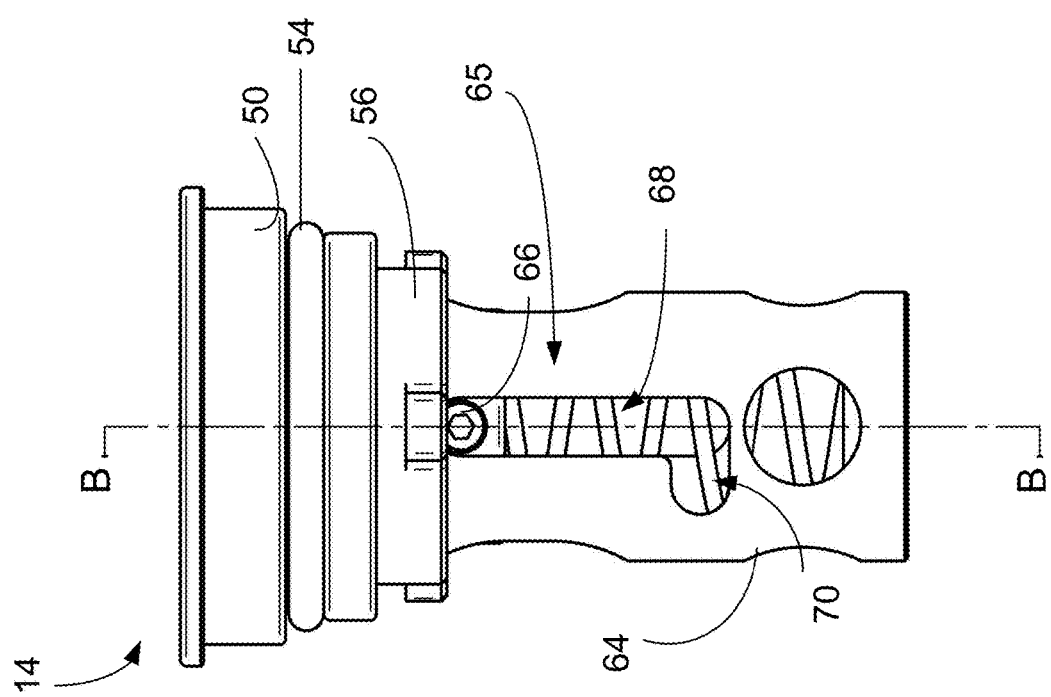
FIGURE 5B
FIGURE 5A

VOLATILE LIQUIDS REFUELING APPARATUS WITH DUAL LOCKING RECEIVER

This application is a Continuation-In-Part of and claims priority to co-pending parent application Ser. No. 15/449,986 filed Mar. 5, 2017 by the same inventor.

TECHNICAL FIELD

The present invention relates generally to devices for refueling mechanical engines.

BACKGROUND ART

There are several situations in which motorized equipment operates using a supply of volatile fuel such as gasoline or kerosine. When equipment must be operated continuously in order to function properly, there is a need to replenish the supply of fuel quickly, safely, and possibly while the motorized equipment continues to function uninterrupted.

One such example of this kind of situation is when gasoline-powered chain saws are used to cut away brush and foliage during a forest fire, in order to create fire breaks. When a fire-fighter needs to refuel his saw, while acting in a dangerous environment with open flames near at hand, it is extremely crucial that transfer of flammable fuel is conducted in an extremely safe manner. Since gasoline is notoriously volatile, it is extremely important that refueling operations do not allow the release of volatile vapors that can ignite with potentially deadly consequences. Thus there is a need for an apparatus and method that can transfer volatile fluids in a manner which contains flammable vapors from the fuel as it is being transferred to the operating saw.

During operation in firefighting, the fuel tanks in gasoline powered saws such as Stihl saws build up excess pressure due to heat. The fuel tanks and caps in these saws are not capable of venting this excess pressure and when the cap is opened during the fueling process, fuel vapor is released under pressure causing a severe safety hazard. A method of safely relieving the pressure buildup inside the fuel tank before the cap is opened is necessary.

What is needed is a system that will eliminate the need for fuel or vapor to be exposed to the atmosphere during the refueling process. This method of refueling is called a "Dry Break System". The basic system works on a fluid exchange principle, instead of a displacement principle. Typically, it is necessary to open both the fuel cap on the saw in addition to the cap on the fuel can, and then pour liquid fuel into the saw exposing both the fuel and vapor to the atmosphere. In contrast a dry break system is sealed. Once the fuel probe and the fuel tank are connected, fluid is simply exchanged from one to the other.

Thus, there is a need for a volatile liquids refueling apparatus which contains volatile fuel vapors during refueling operations.

DISCLOSURE OF INVENTION

Briefly, one preferred embodiment of the present invention is a volatile liquids refueling apparatus.

An advantage of the present invention is that it contains volatile vapors as fuel is transferred.

Another advantage is that the apparatus of the present invention can be locked in either the open position so the user can fill or empty the tank without the use of the probe if necessary, using the chainsaw bar tool or screwdriver, or in the closed position, to prevent spillage during transport.

A further advantage of the present invention is that the receiver uses a tube design with a single spring, thus reducing the cost of manufacturing and greatly simplifying the design.

Another advantage of the present invention is that the apparatus can be installed using a standard chain saw bar tool instead of multiple bolts to secure and seal it to the tank. The probe is designed to be attached to a standard SIG fuel bottle (camping fuel bottle). The probe can be installed on the fuel bottle without the use of tools by incorporating a grip onto the adaptor.

Yet another advantage of the present invention is that the typical tank of a chain saw can be filled in less than 15 seconds from empty to full.

Another advantage of the present invention is that it works on a fluid exchange principle, instead of a displacement principle.

A yet further advantage of the present invention is that the inclusion of springs in the probe and the receiver of the system add an additional level of safety in the field because if the device being fueled and the fuel bottle are dropped in an emergency situation (for example running from sudden fire surge or falling tree limb) the springs will act to automatically disengage the fuel bottle from the device being fueled and close themselves off, and thereby prevent accidental fuel spill and potential for a dangerous flammable fuel spill. Existing devices do not have this feature and will not necessarily disengage if the user drops them or stops putting pressure on the filler side to hold it into the receiver side. This feature adds a significant level of added safety when the device is being used in a firefighting scenario or other situation where a fuel spill could pose extreme danger to the user and anybody close by.

These and other advantages of the present invention will become clear to those skilled in the art in view of the description of the best presently known mode of carrying out the invention of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 5A shows a receiver portion of the present invention;

FIG. 5B shows a cut-away view of the receiver of the present invention as taken through line B-B of FIG. 5A;

DETAILED DESCRIPTION OF THE PREFERRED EMBODIMENTS

Figure 1:
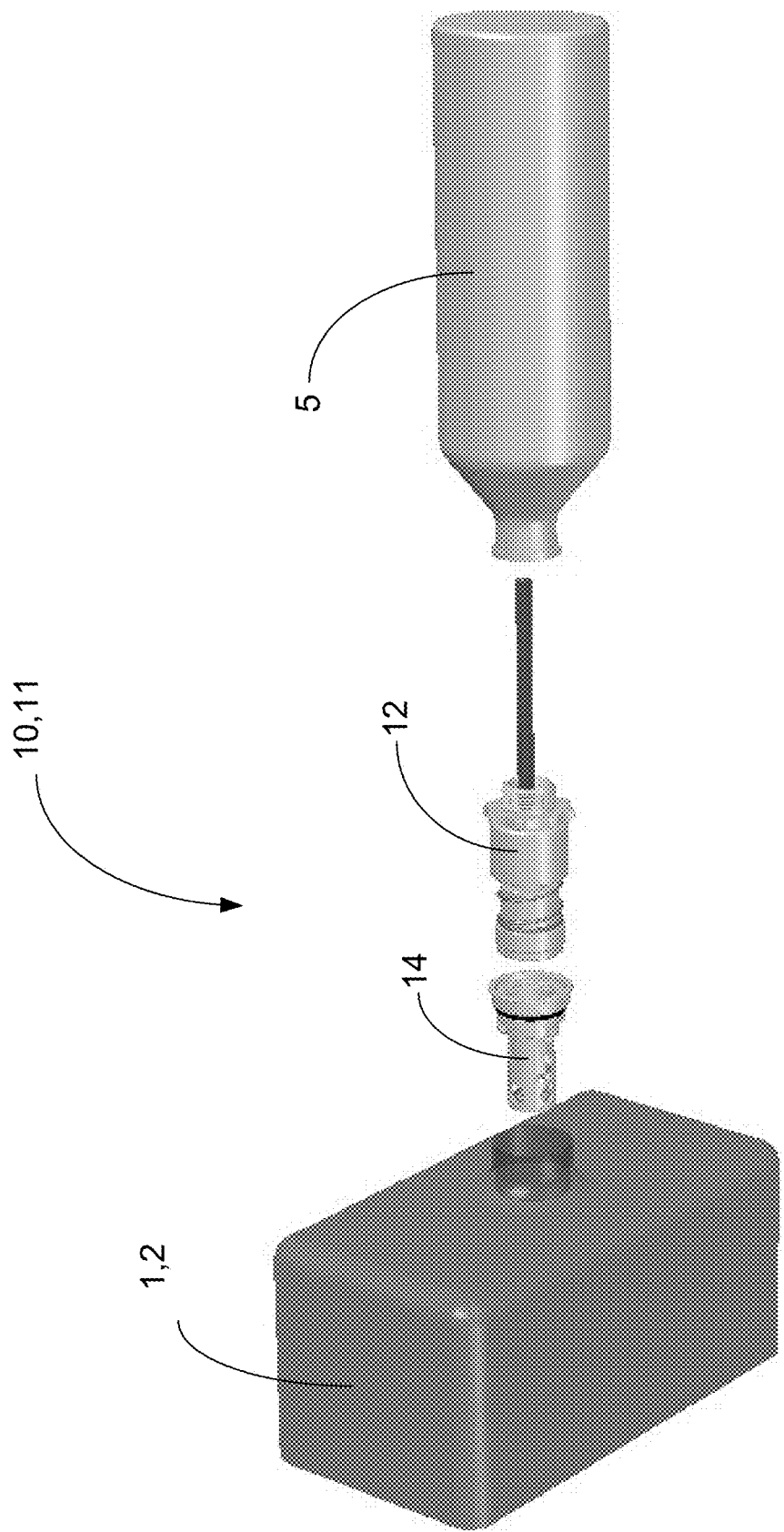
FIG. 1 shows an exploded view of the major elements of the present invention in use with the tank of a fueled device.
Figure 3:
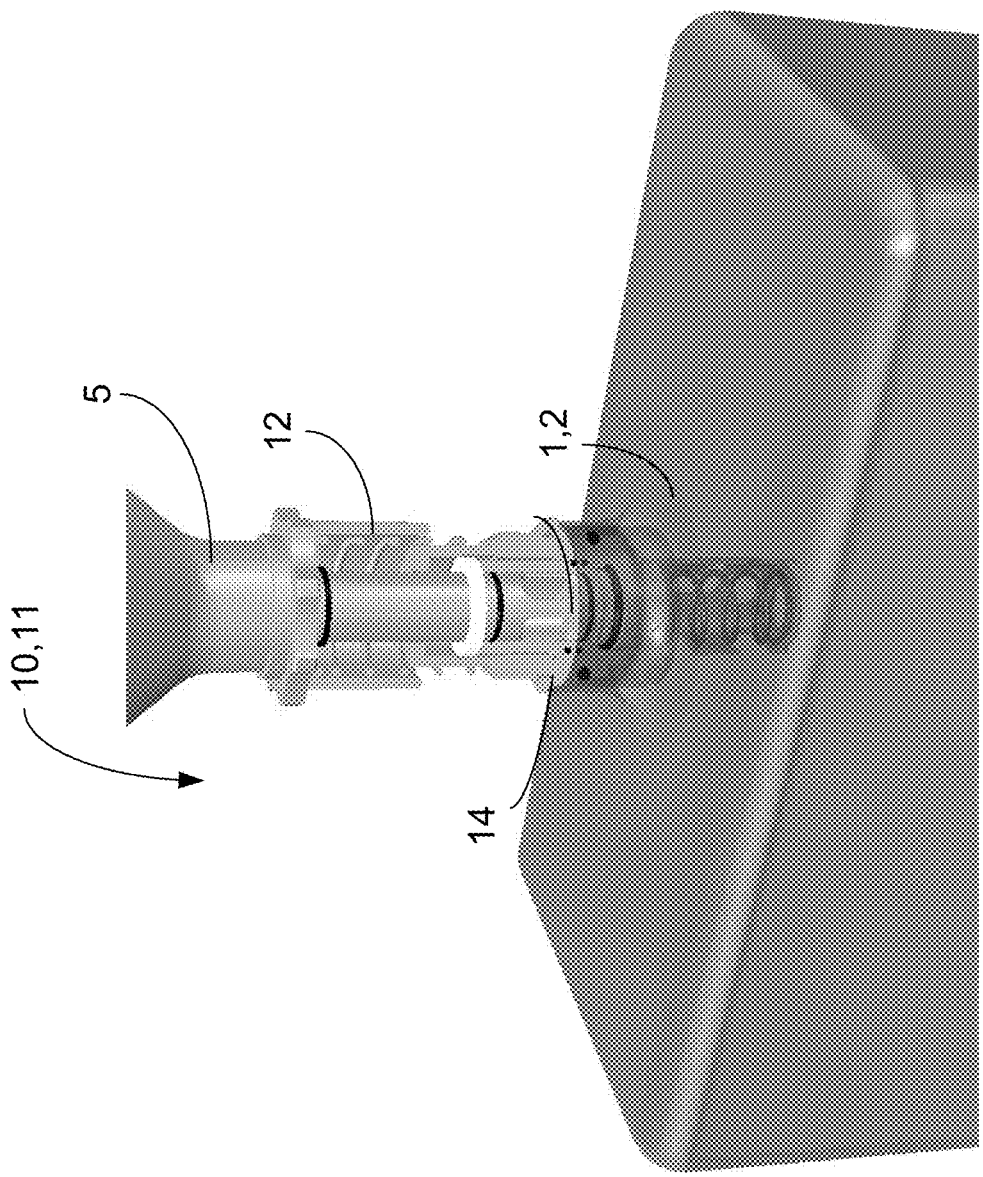
FIG. 3 shows a detailed view of the present invention in use with the tank of a fueled device.
Figure 2:
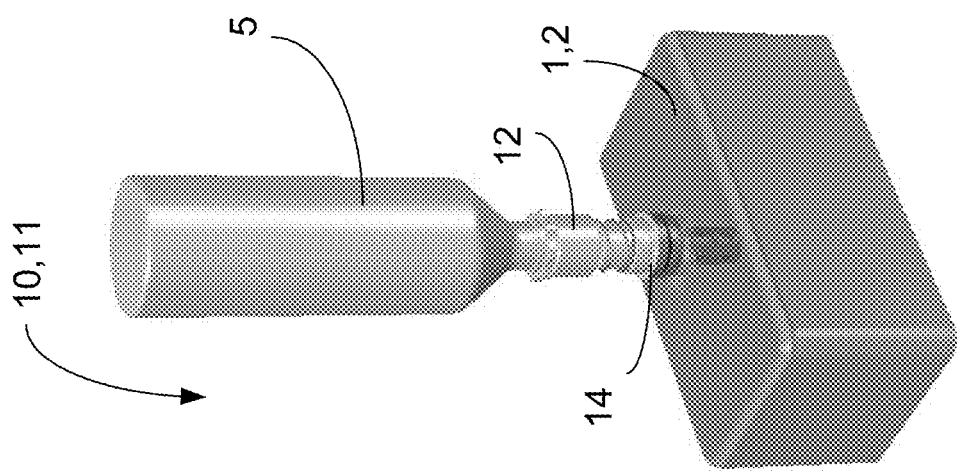
FIG. 2 shows the present invention in use with the tank of a fueled device.

The present invention is a volatile liquids refueling apparatus. It includes a probe 12 and a receiver 14, and together the overall apparatus will be referred to as the refueling apparatus 10. The present refueling apparatus 10 provides a vapor-tight enclosure 11, which allows the transfer of volatile liquids while containing any ignitable vapors The refueling apparatus 10 is designed to work with a fueled device, such as a chain saw (not shown), illustrated in FIG. 1, which may be in need of refueling during continuous operations, such as when being used to create fire breaks when fighting forest fires. The chain saw has a fuel tank 2 with an input port 3 which is closed with a cap (not shown). When in use, the receiver 14 replaces the cap on the fuel tank 2.

The probe 12 is attached or connected to a refueling source, such as a fuel bottle 5, which is typically a bottle or possible a hose that supplies fuel through the probe 12.

When in use, the probe 12 with attached fuel bottle 5 engages the receiver 14 which has been stationed in the tank 2 of the chain saw. The attachment of the probe 12 takes place in three basic stages, which are illustrated in FIGS. 6-8, and will be discussed in detail below.

Figure 4B:
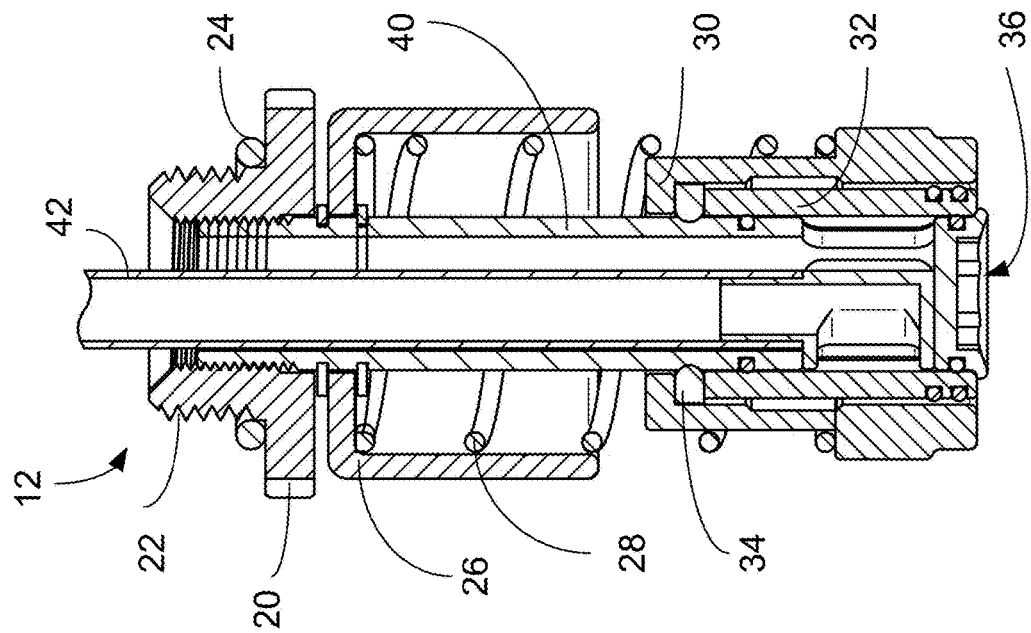
FIG. 4B shows a cut-away view of the probe of the present invention as taken through line B-B of FIG. 4A.
Figure 4A:
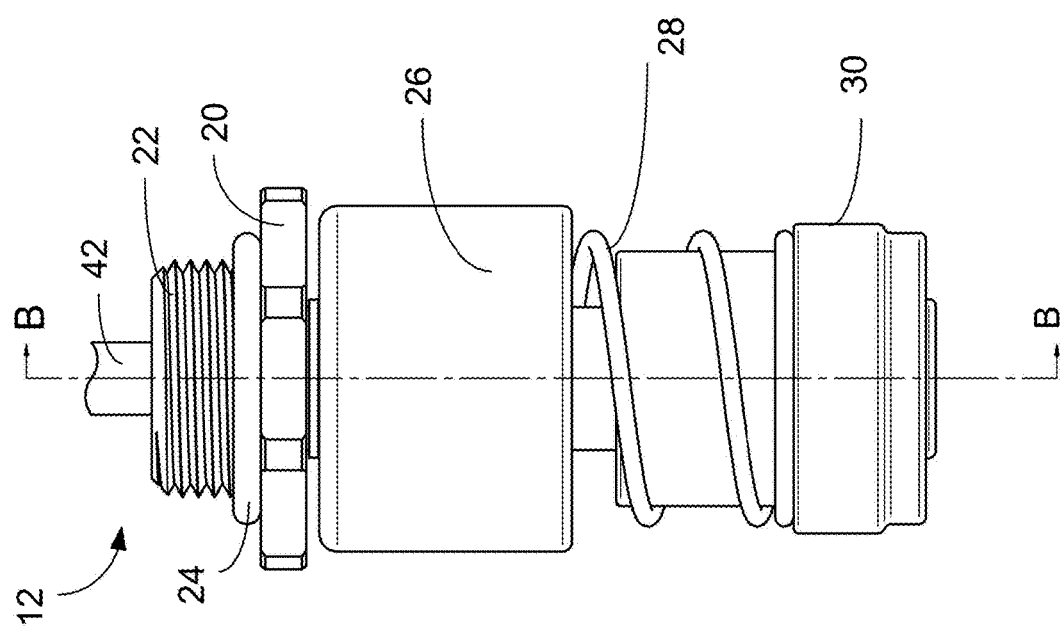
FIG. 4A shows a probe portion of the present invention.

The probe 12 is shown in FIG. 4A and in cross-section in FIG. 4B, which is taken from line A-A in FIG. 4A. Referring now to both FIGS. 4A and 4B, the probe 12 includes fuel bottle adaptor 20 having screw threads 22, an O-ring 24, spring cup 26, spring 28, outer collar 30, seal ring 32, slip ring 34 and aperture 36. Running through the middle of the structure is a central tube 40, which extends into the fuel bottle 5 (see FIG. 1) and directs fuel through the receiver 14 to the fuel tank 2.

The receiver 14 is shown in FIG. 5A and in cross-section in FIG. 5B, which is taken from line B-B in FIG. 5A. Referring now to both FIGS. 5A and 5B, the receiver 14 includes receiver collar 50, receiver aperture 52, O-ring 54, lower adapter 56, plunger 58, spring 60, lower spring plate 62 and receiver housing 64. Also included are a lock-down nut 66 and a lock down channel 68, which will be discussed in more detail below.

Figure 6:
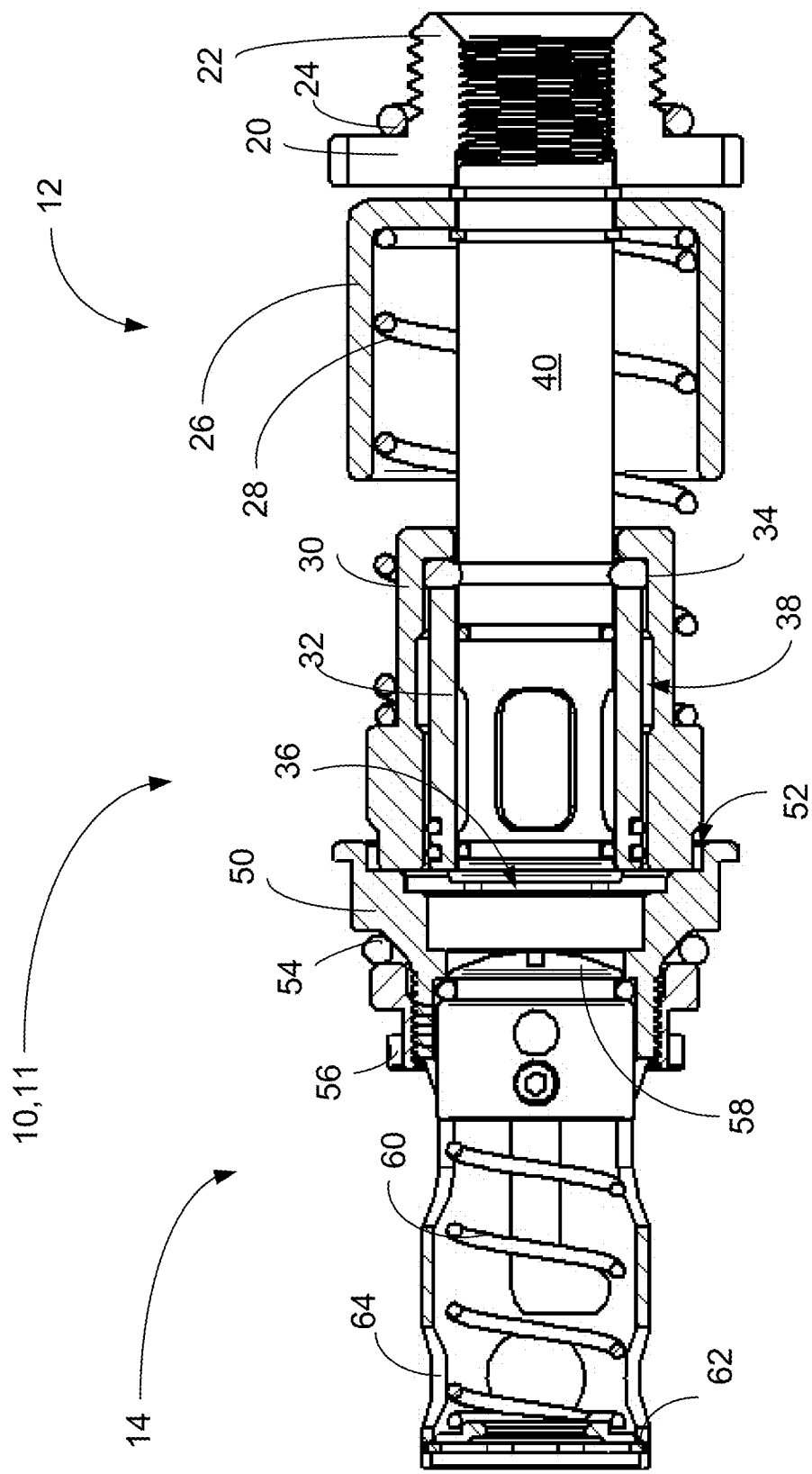
FIG. 6 shows a cut-away view of the apparatus of the present invention in the first stage of attachment.
Figure 7:
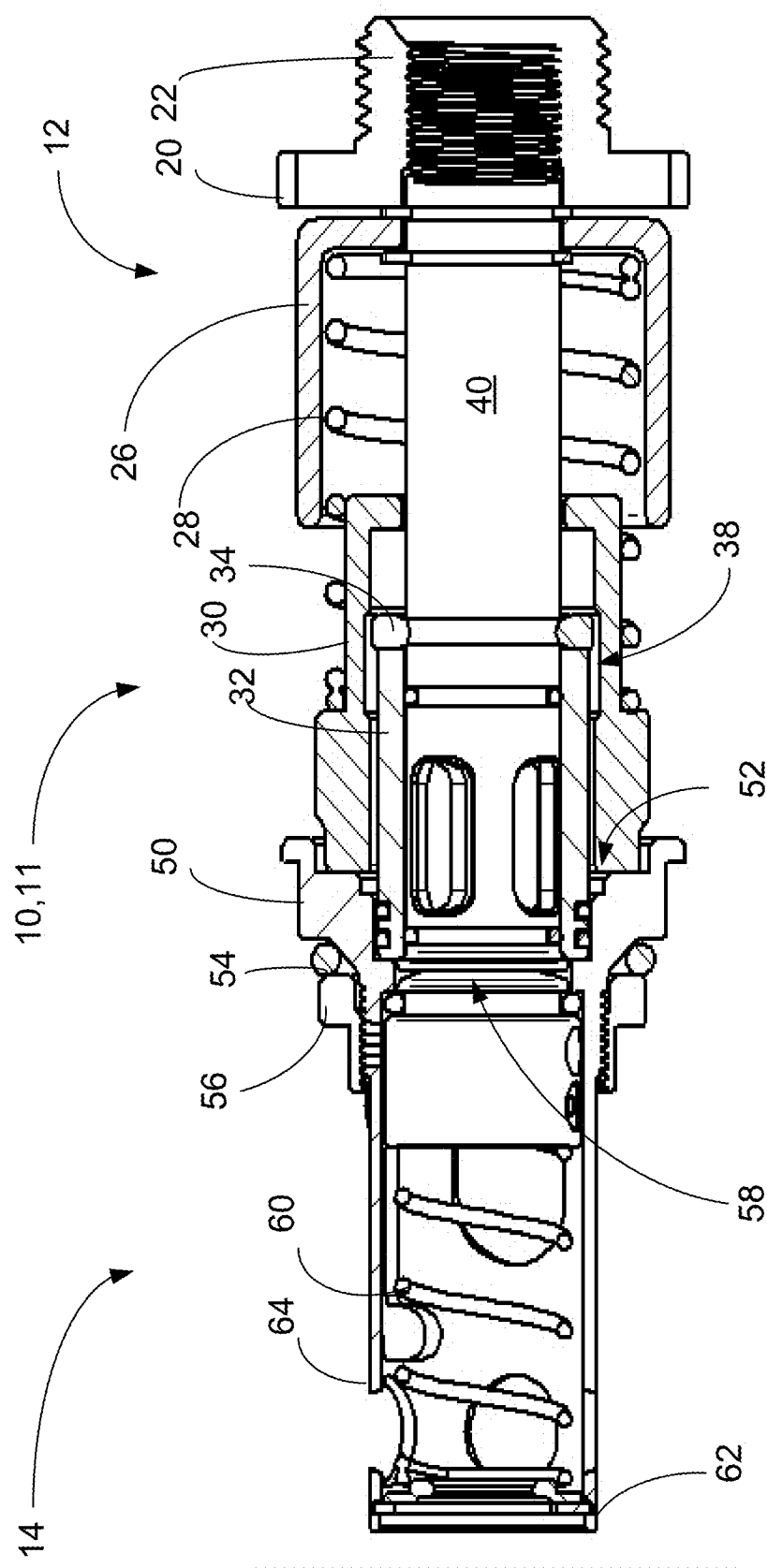
FIG. 7 shows a cut-away view of the apparatus of the present invention in the second stage of attachment.
Figure 8:
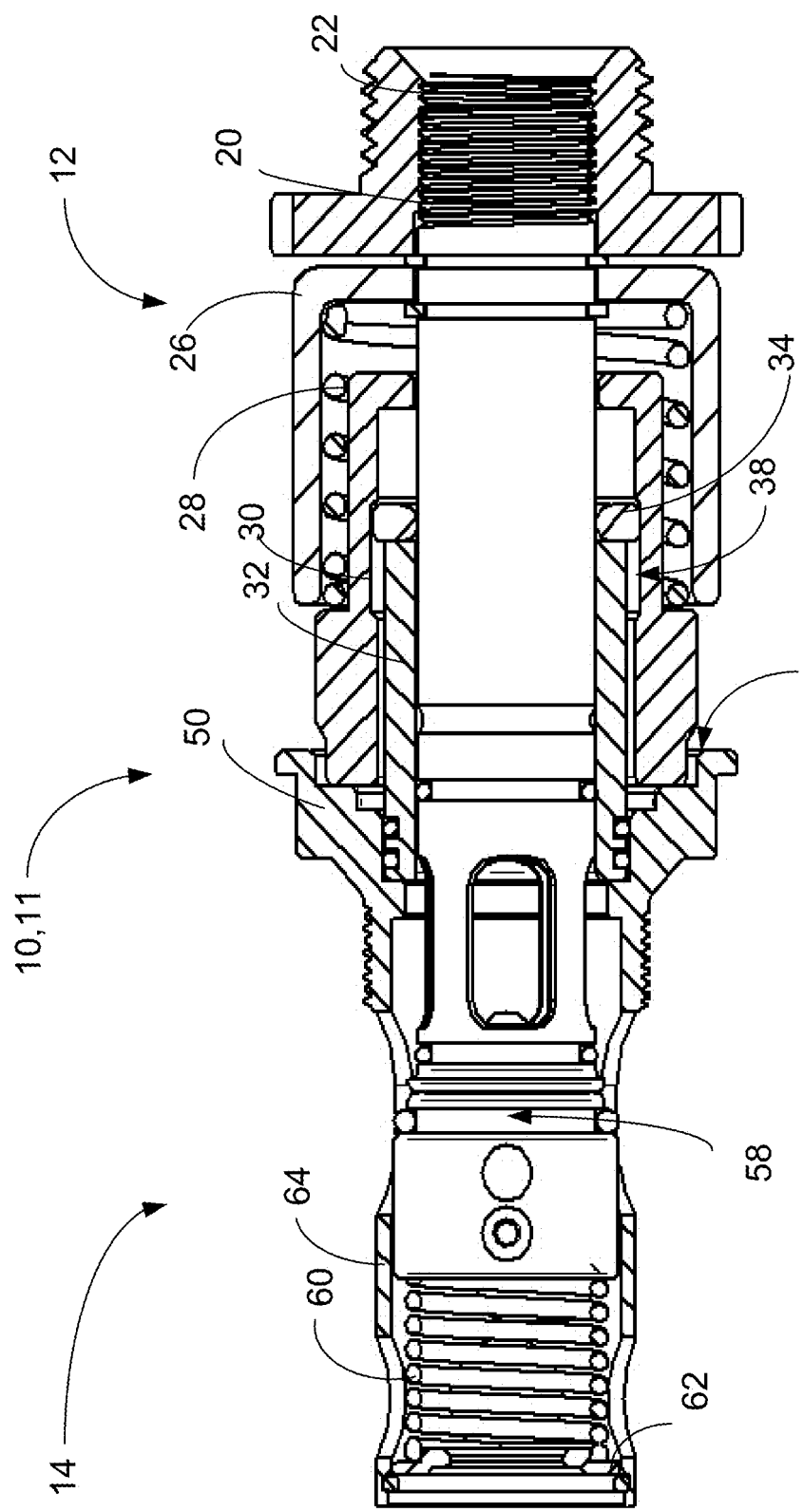
FIG. 8 shows a cut-away view of the apparatus of the present invention in the third stage of attachment.
Figure 10:
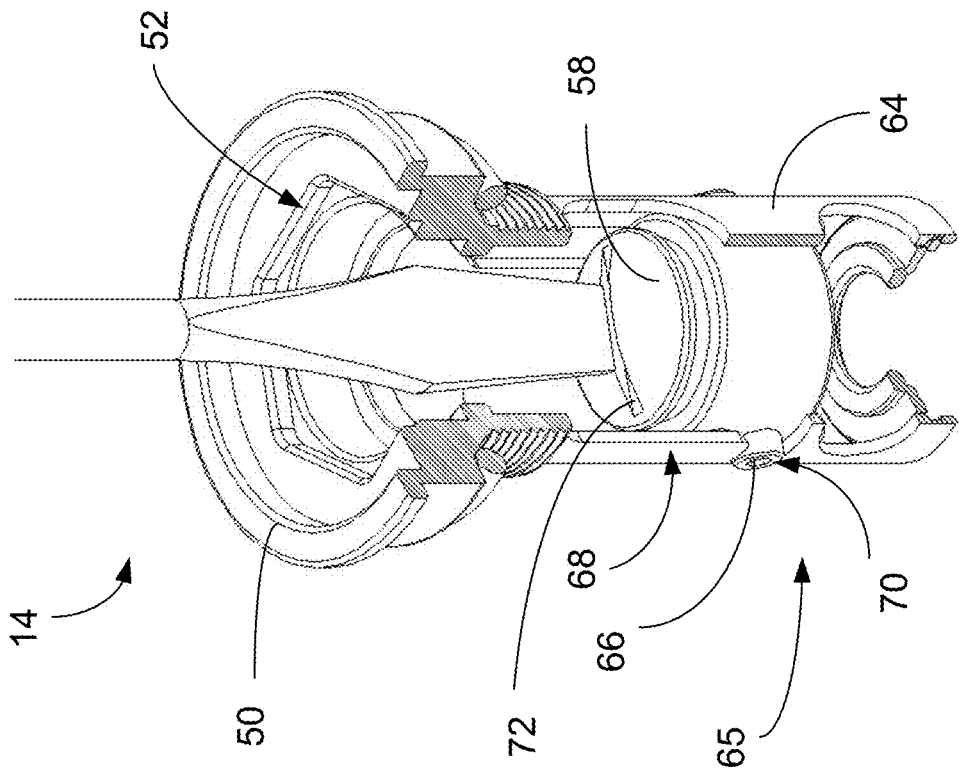
FIG. 10 shows an isometric view with cut-away of the receiver portion of the present apparatus engaged with a screwdriver to engage the lock-down mechanism.
Figure 9:
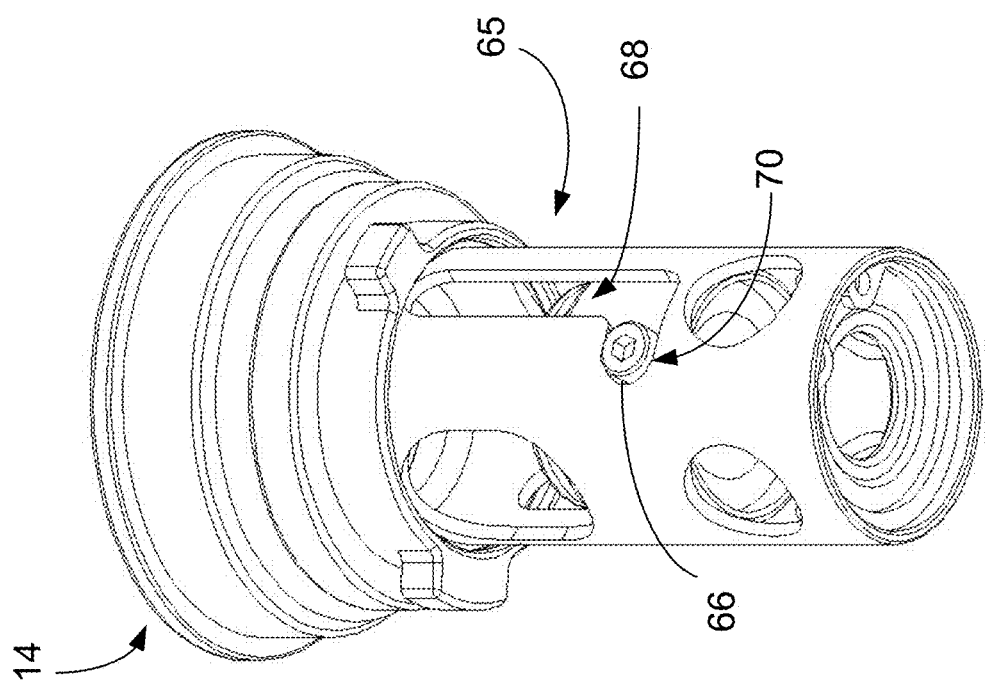
FIG. 9 shows an isometric view of the receiver portion of the present apparatus with the lock-down nut and channel.

FIGS. 6-8 show the three stages of attachment between the probe 12 and the receiver 14. It will be assumed that the receiver 14 has been secured onto the chain saw fuel tank 2 in place of the cap, using the lower adaptor 56. The receiver 14 is installed by removing the original cap, dropping the receiver 14 into the input port (see FIG. 1) and tightening it using the large hex end of a bar tool. The lower adaptor 56 and O-ring 54 configuration are made to fit the same as the original cap, and is preferably made almost entirely of 6061-T6 aluminum in order to keep weight to a minimum and improve durability. Also, vent tube 42, shown in FIG. 4A-B is not shown, but extends from within central tube 40 into the fuel bottle, also not shown, in order to allow vapors to vent from the saw's fuel tank.

The probe 12 is designed to seal against the receiver 14 and is activated in 3 separate stages. The probe 12 includes a slip ring 34, which allows the probe 12 to be extended in the correct order. This is a critical safety feature so that the probe 12 can only be extended if installed into the receiver 14. At no time can it be accidently opened during transportation or storage.

In Stage 1, shown in FIG. 6, the probe 12 is mated with the receiver 14 and is aligned as shown in FIGS. 6, 7, and 8. At this point the receiving aperture 52 and the aperture 36 are aligned. During this stage the slip ring 34 is still in the locked position.

In Stage 2, as seen in FIG. 7, the probe 12 is inserted into the receiver 14 and a seal is made between the seal ring 32 and the receiver 14. At this point the system is now in a sealed state and no vapors, pressure or fuel can escape into the atmosphere. In addition, the outer collar 30 is moved into position so that the slip ring 34 can be pushed up by the seal ring 32. During this stage no fuel has been exchanged.

In Stage 3, as shown in FIG. 8, the probe 12 is further inserted into the receiver 14. As the probe extends it makes contact with the plunger 58 and is pressed down breaking the seal with the upper lip on the receiving collar 50. At this point the seal is also broken between the central tube 40 and the seal ring 32 and allows fuel to flow and air to return though the vent tube 42.

This works on a fluid exchange principle, instead of a displacement principle. Typically, it is necessary to open both the fuel cap on the saw in addition to the cap on the fuel can, and then pour liquid fuel into the saw exposing both the fuel and vapor to the atmosphere. In contrast, the present apparatus is sealed providing a vapor-tight compound enclosure 11. Once the fuel probe 12 and the fuel tank 2 are connected, fluid is simply exchanged from one to the other without back pressure to inhibit the flow.

As the probe 12 is retracted fuel stops flowing once the central tube 40 becomes fully retracted into the seal ring 32. At the same time the plunger 58 seal the fuel tank as it mates with the upper lip on the receiving collar 50. Finally the slip ring 34 is pushed back into the groove on the central tube 40 as illustrated in FIG. 7 and the seal is broken between the seal ring 38 and the receiving collar 50.

An important feature of the present invention is that the apparatus of the present invention can be locked in the open position so the user can fill or empty the tank 2 without the use of the probe 12 if necessary, using a chainsaw bar tool or screwdriver.

Referring now to FIGS. 5A-B and FIGS. 9 and 10, a slot 72 in the top of the plunger 58 and a lock-down mechanism 65 allow the user to press the plunger 58 down with a bar tool or screw driver and turn it to lock it in an open position. The lock-down mechanism preferably includes a lock-down screw 66 which travels down a lock-down channel 68 and is turned into a side passage 70 by rotation of the screw slot 70, where the lock-down screw 66 is captured. This locks the plunger 58 in the down position so that the saw can be filled with a traditional fuel container.

A further embodiment of the present invention includes a dual locking receiver which can be locked in either an open position or a closed position. This is a safety feature that ensures that the receiver cannot be opened even if the probe is installed. Thus, in the case of an accident or during transport there is no possibility of the receiver being opened and fuel or vapor escaping. This feature is engaged again by inserting a screw driver or "bar tool" into the slot on the plunger and turning it 45 degrees.

Referring now to FIGS. 5A-B and FIGS. 11 through 14, a slot 72 in the top of the plunger 58 and a dual locking mechanism 75 allow the user to press the plunger 58 down with a bar tool or screw driver and turn it to lock it in can be locked in either an open position or a closed position.

Figure 12:
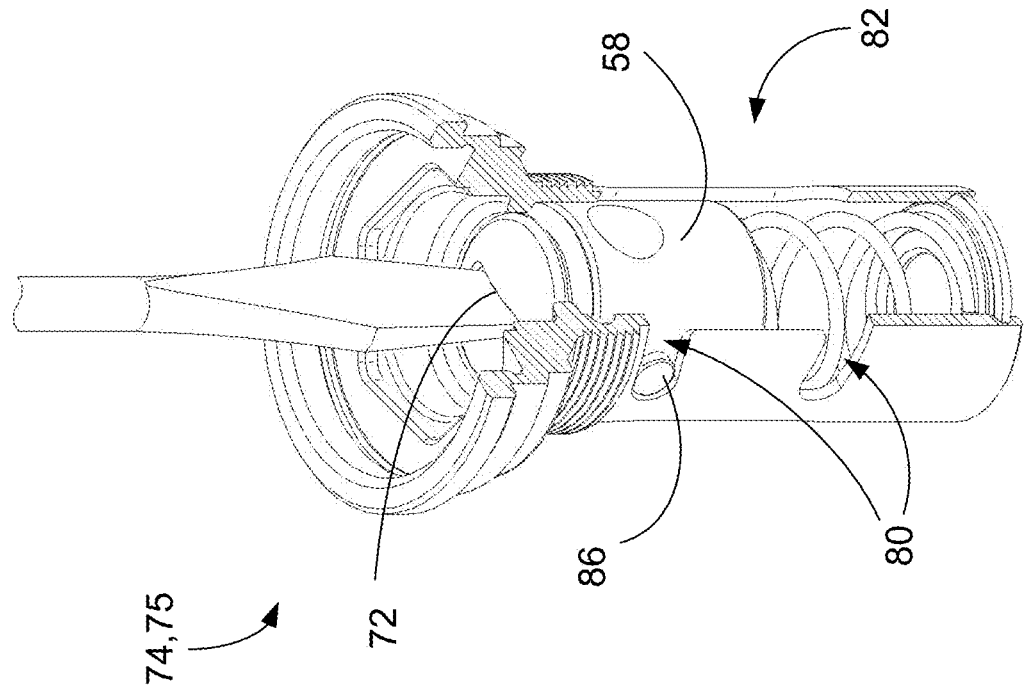
FIG. 12 shows an isometric view with cut-away of the receiver portion of the present apparatus which locks in both open and closed configurations engaged with a screwdriver to engage the dual locking mechanism in the lock closed position.
Figure 11:
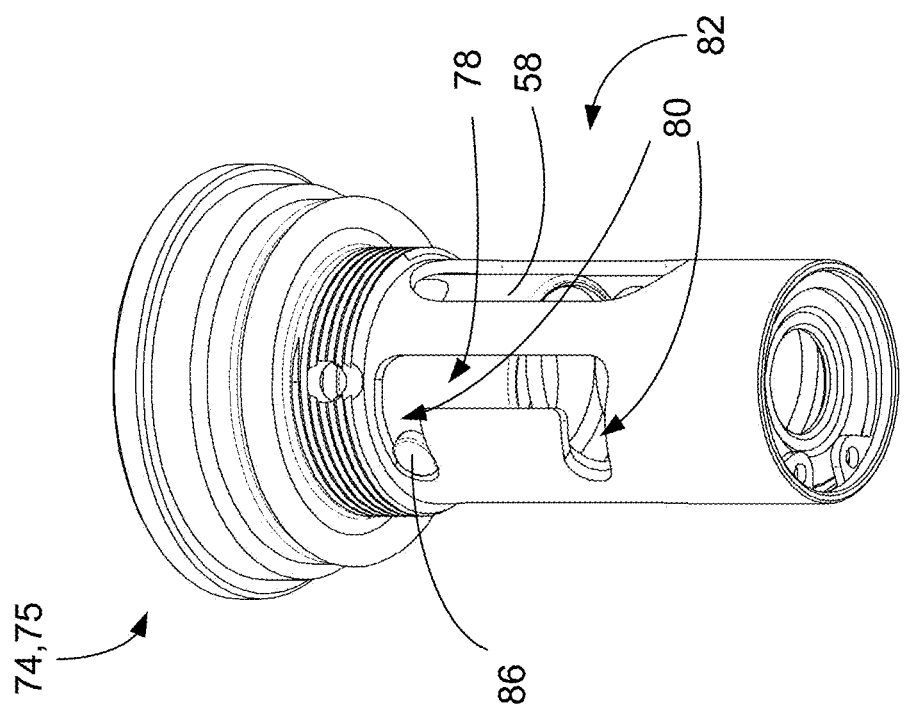
FIG. 11 shows an isometric view of the receiver portion of the present apparatus with the lock-down nut and channel which locks in both open and closed configurations, which is positioned in the lock closed position.

In FIGS. 11 and 12, the dual locking receiver 74 is shown in the locked closed position 82. The dual locking mechanism 75 preferably includes a lock-down protrusion 86, which could be a screw or pin, which travels down a dual locking channel 78 and is turned into one of two dual side passages 80 by rotation of the screw slot 72, where the lock-down screw 66 is captured. This locks the plunger 58 in the locked closed 82 position so that the saw can be transported without fear of leakage or spillage.

Figure 14:
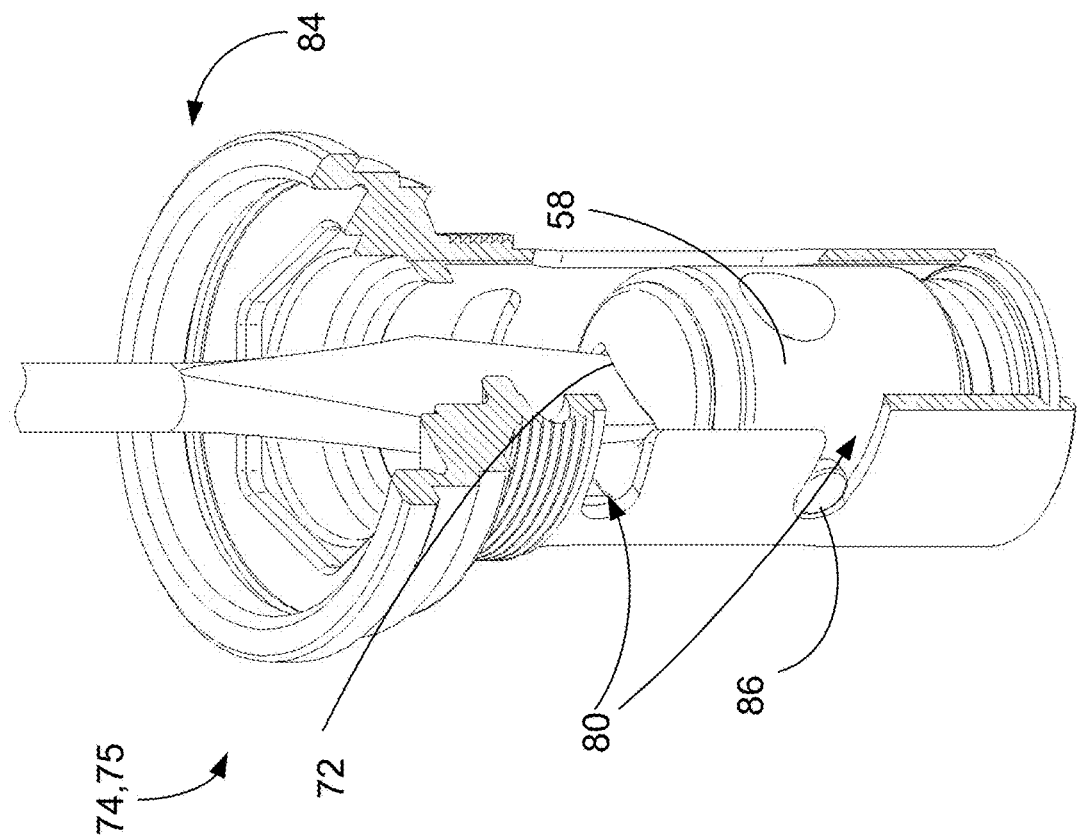
FIG. 14 shows an isometric view with cut-away of the receiver portion of the present apparatus which locks in both open and closed configurations engaged with a screwdriver to engage the dual locking mechanism in the lock open position.
Figure 13:
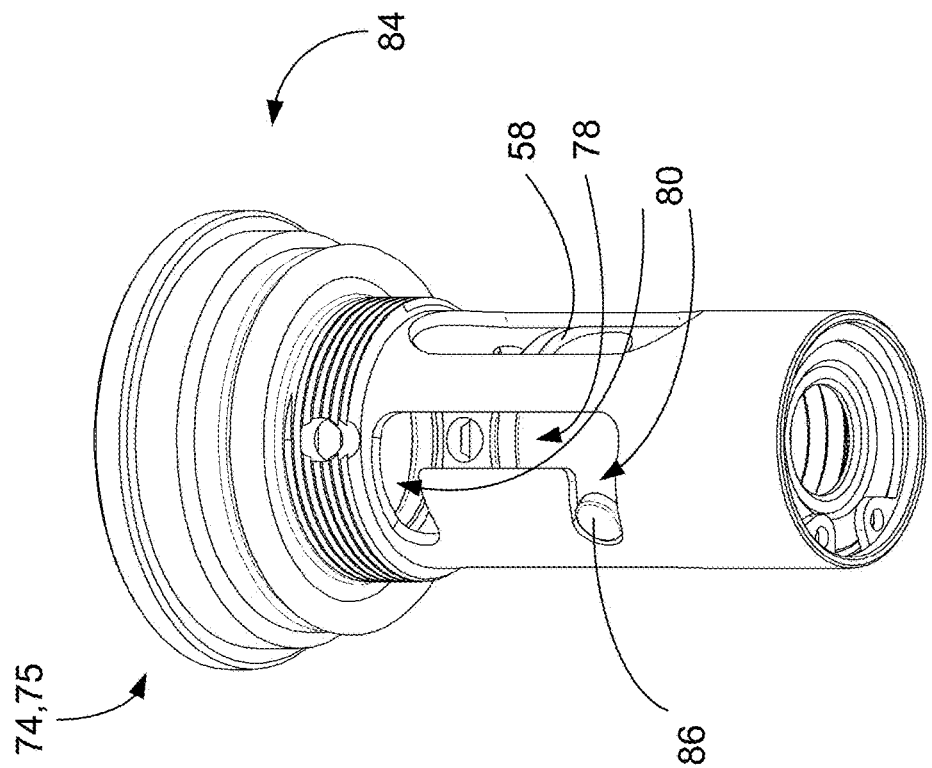
FIG. 13 shows an isometric view of the receiver portion of the present apparatus with the lock-down nut and channel which locks in both open and closed configurations, which is positioned in the lock open position.

In FIGS. 13 and 14, the dual locking receiver 74 is shown in the locked open position 84. The dual locking mechanism 75 preferably includes a lock-down protrusion 86, which could be a screw or pin, which travels down a dual locking channel 78 and is turned into one of two dual side passages 80 by rotation of the screw slot 72, where the locking screw 66 is captured. This locks the plunger 58 in the locked open 84 position so that the saw can be filled with a traditional fuel container.

The threaded adaptor 20 allows the present apparatus to be installed by hand (no tools needed) onto a standard fuel (SIG) bottle.

While various embodiments have been described above, it should be understood that they have been presented by way of example only, and not limitation.

The invention claimed is:

1. A receiver for a volatile liquid refueling apparatus, comprising:
    a dual locking mechanism whereby said apparatus can be locked in either an open position which allows fluid flow or a closed position which blocks fluid flow, where said dual locking mechanism comprises a locking protrusion which travels down and a dual locking channel and is turned into one of two dual side passages where the locking protrusion is captured to lock the receiver in a closed position or is captured in the second of two dual side passages to lock the receiver in an open position.

* * * * *